United States Patent [19]
Lam

[11] Patent Number: 5,500,689
[45] Date of Patent: Mar. 19, 1996

[54] SYSTEM FOR DETECTING A VIDEO SIGNAL IMAGE INTENSITY GRADIENT

[75] Inventor: Wai-Man Lam, Carmel, Ind.

[73] Assignee: Thomson Consumer Electronics, Inc., Indianapolis, Ind.

[21] Appl. No.: 329,563

[22] Filed: Oct. 26, 1994

[51] Int. Cl.$^6$ .................................................. H04N 7/28
[52] U.S. Cl. ............................................. 348/699; 348/700
[58] Field of Search ...................................... 348/699, 700, 348/595

[56] References Cited

U.S. PATENT DOCUMENTS

| | | | |
|---|---|---|---|
| 4,779,131 | 10/1988 | Matsumoto et al. | 348/699 |
| 5,162,907 | 11/1992 | Keating et al. | 348/416 |
| 5,200,820 | 4/1993 | Gharavi | 348/416 |
| 5,245,436 | 9/1993 | Alattar | 348/595 |

OTHER PUBLICATIONS

Video Compression Makes Big Gains, by Ang et al., IEEE Spectrum, Oct. 1991.

*Primary Examiner*—Tommy P. Chin
*Assistant Examiner*—A. Au
*Attorney, Agent, or Firm*—Joseph S. Tripoli; Eric P. Herrmann; Ronald H. Kurdyla

[57] ABSTRACT

In a video signal processor including a motion compensated predictive coding data compression system, three adjacent image frames (1, 2, 3) are analyzed to detect a luminance gradient such as is typically associated with image fading. The frames are similarly divided into several segments (A . . . L). The sum of the absolute pixel value differences between corresponding segments from adjacent frames is obtained for each of two pairs adjacent frame segments ($DIFF_{1-2}$; $DIFF_{2-3}$). The ratio of the two frame differences (S) is obtained for each segment. Fading is indicated if the ratio remains substantially constant for all or a predetermined number of regions. If fading is detected, any motion vectors generated by the motion coder are assigned a zero value and are not coded.

7 Claims, 4 Drawing Sheets

SYSTEM FOR DETECTING A VIDEO SIGNAL IMAGE INTENSITY GRADIENT

BACKGROUND OF THE INVENTION

This invention is related to the field of digital image signal processing, and more particularly to a system for detecting video signal image intensity gradient such as a luminance gradient associated with image fading, e.g., from a normal image to black level or vice-versa.

A video sequence such as represented by a television signal, for example, is a series of motionless images shown in rapid succession to give a viewer an impression of continuous motion. Each frame conveys distinctive image information, and the high frame rate necessary to achieve an appearance of motion often results in a significant amount of redundant temporal information among adjacent frames. Motion compensation coding, a form of data compression, is a form of predictive coding in a temporal dimension that is often used to attempt to remove such temporal redundancy.

In the absence of a scene change from one frame to the next, image motion from one frame to the next accounts for much of the variation in image intensity from one frame to the next. In motion compensated predictive image coding, the current frame is predicted from a previously coded frame by estimating the motion between the two frames and compensating for the motion. The difference between the current frame and the prediction of the current frame is commonly called the (motion compensated) residual image, which is coded. The energy in the residual image is typically much less than the energy in the original image due to the removal of the redundant temporal information. Encoding the residual information rather than the original image information results in a more efficient use of the data bits available for coding.

Motion compensated predictive coding may assume many forms. One popular approach is based on block matching. In this approach the current image frame is partitioned into a prescribed number of rectangular regions or blocks, and a search is performed for the displacement in an adjacent frame which produces the best match among possible blocks in the adjacent frame. A motion vector with associated x,y coordinates establishes the relationship between the block in the current frame and its best match in the adjacent frame. Motion compensated (residual image) coding is an example of inter-frame (flame-to-frame) coding. In cases where motion compensated residual coding does not produce acceptable results (eg., where the prediction is not good as when a scene changes from one frame to the next), better results may be obtained by intraframe coding, where the video information of the frame is itself coded without motion compensation.

Various types of image coding/compression, including interframe predictive motion compensated coding as discussed above, are discussed by Ang et al. in *Video Compression Makes Big Gains,* IEEE Spectrum, October 1991, for example. In particular, this article describes a CCITT H.261 video motion coder including provision for intraframe coding, and inter-frame predictive motion compensated residual coding compatible with the proposed MPEG (Moving Pictures Expert Group) image coding standard (ISO/IEC 13818-2, November 1993). The proposed MPEG standard also employs a motion compression algorithm with both inter- and intra-frame modes.

Under certain conditions some motion estimators are not sophisticated or efficient enough to eliminate image "blockiness" artifacts (a noticeable difference in detail among pixel blocks that constitute an image). Such an artifact may be produced, for example, by motion estimators employing Mean Square Error or Mean Absolute Error processing, due to an erroneous match. More specifically, during an image fade from a normal image to black or vice-versa, frame-to-frame changes in image texture (detail) cannot be accurately tracked by other than highly sophisticated motion estimators. This inability to track frame-to-frame image detail leads to luminance tracking instead. Luminance tracking produces wrong information from the motion estimator, since if the image is motionless a luminance change with fading will falsely suggest motion. In other words, a frame-to-frame luminance gradient associated with image fading may fool the motion estimator into thinking there is motion when the motion estimator cannot discern that the image detail has not changed. Such tracking of a luminance gradient produces random, unpredictable results (eg., false "motion vectors") which are essentially useless and detrimental to coding efficiency.

SUMMARY OF THE INVENTION

In accordance with the principles of the present invention, it is herein recognized that it is desirable to provide a system for detecting an image intensity gradient such as a luminance gradient that is typically associate with image fading, for example. The disclosed system may be advantageously used in a video signal processing system including motion compensation to assign a value of zero to motion vectors under certain conditions. One of these conditions has been described above in the context of an image intensity gradient such as is commonly associated with image fading, where it has been found that zeroing false "motion vectors" significantly reduces or eliminates the described "blockiness" artifacts, and promotes coding efficiency.

In an illustrated embodiment, a sequence of three adjacent image frames is evaluated. Each frame is partitioned into a similar arrangement of segments. The sum of the absolute values of differences between similarly located pixels in corresponding segments from adjacent frames is obtained for each of two pairs of adjacent frame segments. The ratio of the sums of the absolute pixel differences is obtained. Fading is indicated if the ratio remains substantially constant for a prescribed number of segments.

DETAILED DESCRIPTION OF THE DRAWINGS

Figure 1:
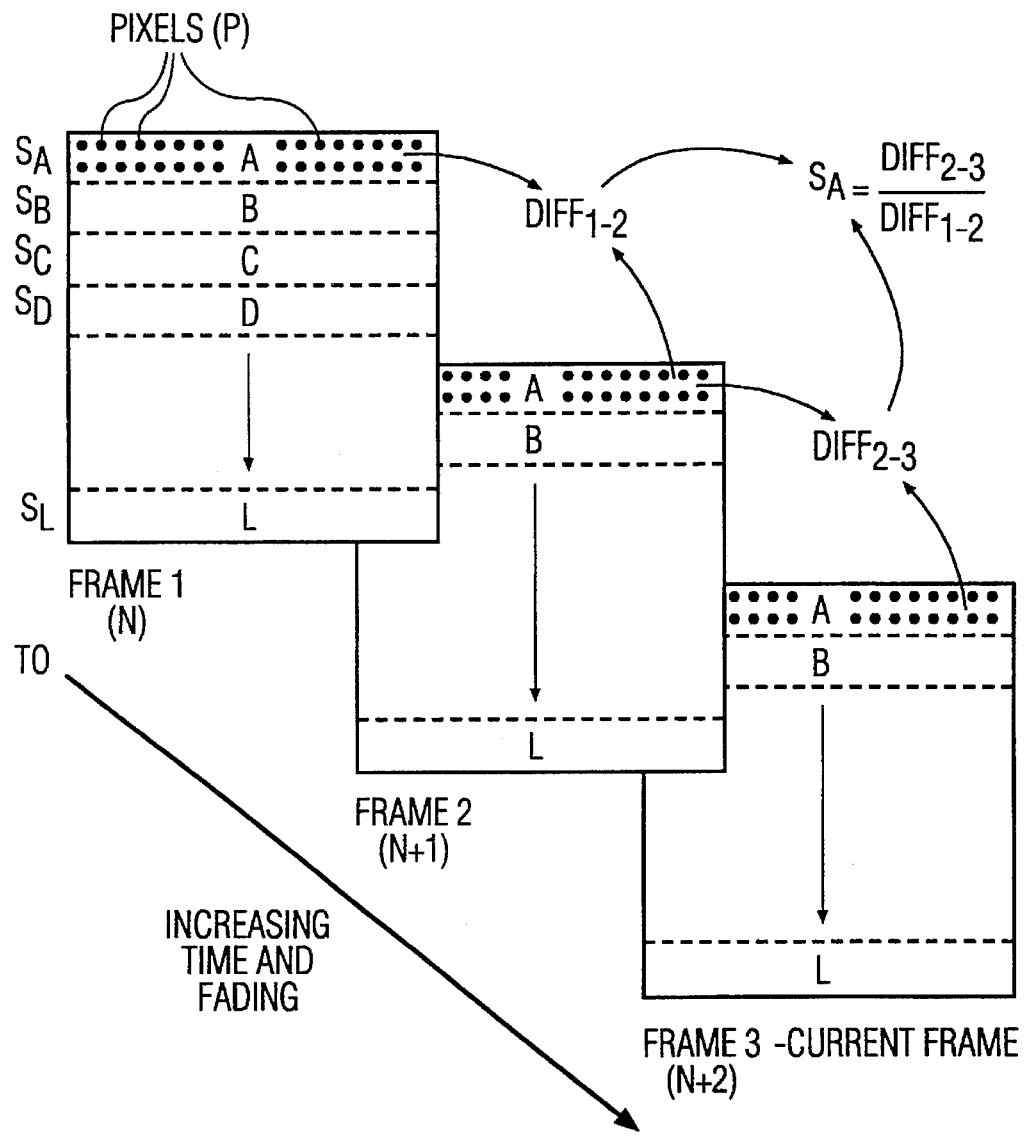
FIG. 1 is a pictorial of a sequence of image frames illustrating an algorithm for indicating the presence of image fading.

FIG. 1 shows a sequence of three adjacent image frames, which in this example contain non-interlaced lines. The following discussion also applies to a sequence of lineinterlaced frames, each containing odd and even fields, as will be discussed subsequently. Frame 3 is a current frame which is in the process of being coded, eg., by the apparatus of FIG. 2 as will be discussed. Frame 2 immediately precedes frame 1 in time, and frame 3 immediately precedes frame 2 in time. Each frame is partitioned into an identical arrangement of 12 horizontal segments designated "A" through "L" in this example. Vertical segments, blocks or other geometric arrangements also may be used. Each frame contains a plurality of image pixels P as known. The number of segments is not critical as long as enough segments, or regions, of an image are provided to reliably indicate the occurrence of image fading in accordance with the requirements of a given system. In this illustration, frame 3 exhibits the most fading (eg., from a normal image to black), and frame 1 exhibits the least fading in the three frame sequence.

It has been determined that an analysis of three consecutive frames is sufficient to indicate the presence of image fading. Three frame storage devices which may be needed in this regard may be associated with video encoders of the type to be discussed in connection with FIG. 2, or the frame storage devices may be provided independently. Multiple frame storage devices are often found in video encoders for preprocessing operations such as detelecine or prefiltering operations. The following explanation is given with respect to an analysis of corresponding segments "A" in each of the three adjacent frames. Frame difference information obtained from this analysis is used to produce a ratio $S_A$. This value of this ratio, when compared to the similarly computed ratios for all the other segments, indicates whether or not image fading is present. The procedure described below is illustrated by the flowchart of FIG. 3. The FIG. 3 flowchart encompasses the processing of lineinterlaced frames as will be discussed.

As a first example, consider a fade-to-black situation as follows

| Frame No. | 1 | 2 | 3 |
|---|---|---|---|
| Fading sequence | 1 | a | $a^2$ |

A fading factor "a" has an arbitrary value but is less than unity since it indicates the reduction in pixel or segment magnitude from one frame to the next as the image fades from normal to black. In practice, the change in luminance level is a good indicator of the amount of change in pixel intensity during fading. This fading sequence (1 . . . a . . . $a^2$) is not predetermined, but is shown as one example of how fading may occur from frame 1 (unity fading factor, no fading), through frame 2 to frame 3 (maximum fading). Thus the amount of fading increases in the progression from frame 1 through frame 2 to (current) frame 3.

Referring to FIG. 1, for corresponding segments A in frames 1 and 2, the difference between the intensity values of similarly located pixels in corresponding segments of adjacent frames is determined. The absolute value of each pixel difference is then obtained. These absolute values are then summed, producing a frame difference value $DIFF_{1-2}$. A similar procedure is used with respect to frames 2 and 3 to obtain a frame difference value $DIFF_{2-3}$. Finally, the ratio of frame difference value $DIFF_{2-3}$ to frame difference value $DIFF_{1-2}$ is obtained. It can be shown that the frame difference ratio for this example is equal to a value which corresponds to value "a" in the fading sequence illustrated above. This difference ratio for segments "A" among frames 1, 2 and 3 is designated $S_A$. A similar procedure is used with respect to remaining segments B–L to obtain difference ratios $S_B$–$S_L$.

Image fading is indicated if computed frame difference ratio value "a" remains substantially constant among image segments A–L. However, it is not necessary for the ratio value to remain substantially equal for all segments. In accordance with the requirements of a given system, it may be sufficient for a predetermined number of segments, eg., 80%–90%, or a majority, to exhibit equal ratio values. This number may be a parameter of the algorithm, along with a threshold value for deciding whether or not a computed ratio is equal to value "a." This predetermined number also accounts for the possibility that image motion may be present during the fading sequence.

For example, when there is much motion during a fade and only 40%–50% of the segments have the same ratio value, the fading detection system will declare that no fading has occurred. In this case, even if fading is occurring, it is considered undesirable for the encoder to zero the motion vectors since a large percentage of the blocks being coded may have motion. Zeroed motion vectors will not be used in this case, since the use of non-zero motion vectors will be beneficial. A frame difference ratio value of zero or approximately zero, for example, is an indication that fading has not occurred. More specifically, if the frame difference value DIFF for any single segment (or a predetermined number of segments) is zero or close to zero, the algorithm may declare a condition of no fading. This criterion will prevent a still or nearly still image from being declared a fading image.

A fade from black to a normal scene is the reverse of the fade-to-black process and would be handled similarly. For example, consider a fade from black to normal image situation where the fading factor changes from "a" to "b" over the course of a frame sequence, as follows.

| Frame No. | 1 | 2 | 3 | 4 |
|---|---|---|---|---|
| Fading sequence | a | $a^2$ | $a^2b$ | $a^2b^2$ |

In this example factor "a" is less than unity, and factor "b" is less than unity but greater than factor "a". As in the other example, this fading sequence is not predetermined, but illustrates another example of how fading may occur from frame 1 (fading begins), through frames 2 and 3 to frame 4 (fading to a normal image completed). Difference values $DIFF_{1-2}$ and $DIFF_{2-3}$ are determined for each segment and frame difference ratios SA–SL are computed, as discussed above. It can be shown that the difference ratio for this example is equal to a value "a(1-b)/(1-a)". Image fading is indicated if this value remains substantially constant among all or a predetermined number of image segments A–L, as discussed above. Analogous results will be obtained in the case of a fade from normal to black where the fading factor changes.

To simplify the drawing, FIG. 1 illustrates the fade detection process using three image frames. However, in a line interlaced system, each frame is constituted by an odd numbered image field and an even numbered image field, as known. In such case the previously described difference ratios would be computed separately for the sequence of odd and even fields. For example, the odd field difference ratio SA(odd) would be computed as $$SA(\text{odd}) = \frac{DIFF_{2-3}(\text{odd})}{DIFF_{1-2}(\text{odd})}$$

where $DIFF_{2-3}$(odd) is the sum of absolute pixel differences between the odd field of frame 2 and the odd field of frame 3. $DIFF_{1-2}$(odd) is the sum of the absolute pixel differences between the odd field of frame 1 and the odd field of frame 2. A comparison is made of SA(odd) with SB(odd) . . . up to SL(odd) to determine whether the ratios remain substantially constant for a predetermined number of segments. Similarly, the even field difference ratios are computed, and SA(even) is compared with SB(even) . . . up to SL(even). This separate field comparison enables the system to detect fading in field boundaries.

Figure 4:
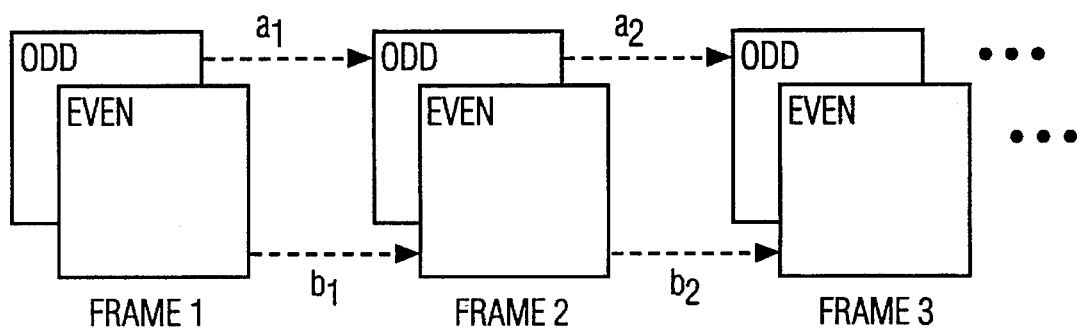
FIG. 4 illustrates a sequence of line-interlaced frames each containing odd and even image fields which may be processed by the fading detection system discussed in connection with FIG. 1.

FIG. 4 shows a sequence of line-interlaced frames 1, 2 and 3 each constituted by an odd field and an even field. In this example the fading factor for the sequence of odd fields changes from $a_1$ to $a_2$ and so on, while the fading factor of the sequence of even fields changes by a different factor, from $b_1$ to $b_2$ and so on. In this type of field fading, the odd and even difference ratios (SA . . . ) are calculated and compared separately.

As a result of the described algorithm, a control signal is developed to indicate whether or not image fading has occurred. This control signal is advantageously used by a video signal encoder to alter signal processing as will be described in connection with the MPEG compatible video (television) signal processing and data compression system shown in FIG. 2.

In the example of FIG. 1, corresponding frame/field segments are subjected to processing in which the sum of the absolute values of pixel differences between co-located pixels in adjacent fields is produced. Other types of processing may be used, depending on the requirements of a given system. For example, for corresponding segments in adjacent fields, the absolute value of the pixels in each segment could be obtained, then summed for each segment. Afterwards the field difference of the sums would be determined. The difference (in contrast to the absolute difference) between corresponding co-located pixels in adjacent similar parity odd or even fields can also be used in the fading detection operation.

Figure 2:
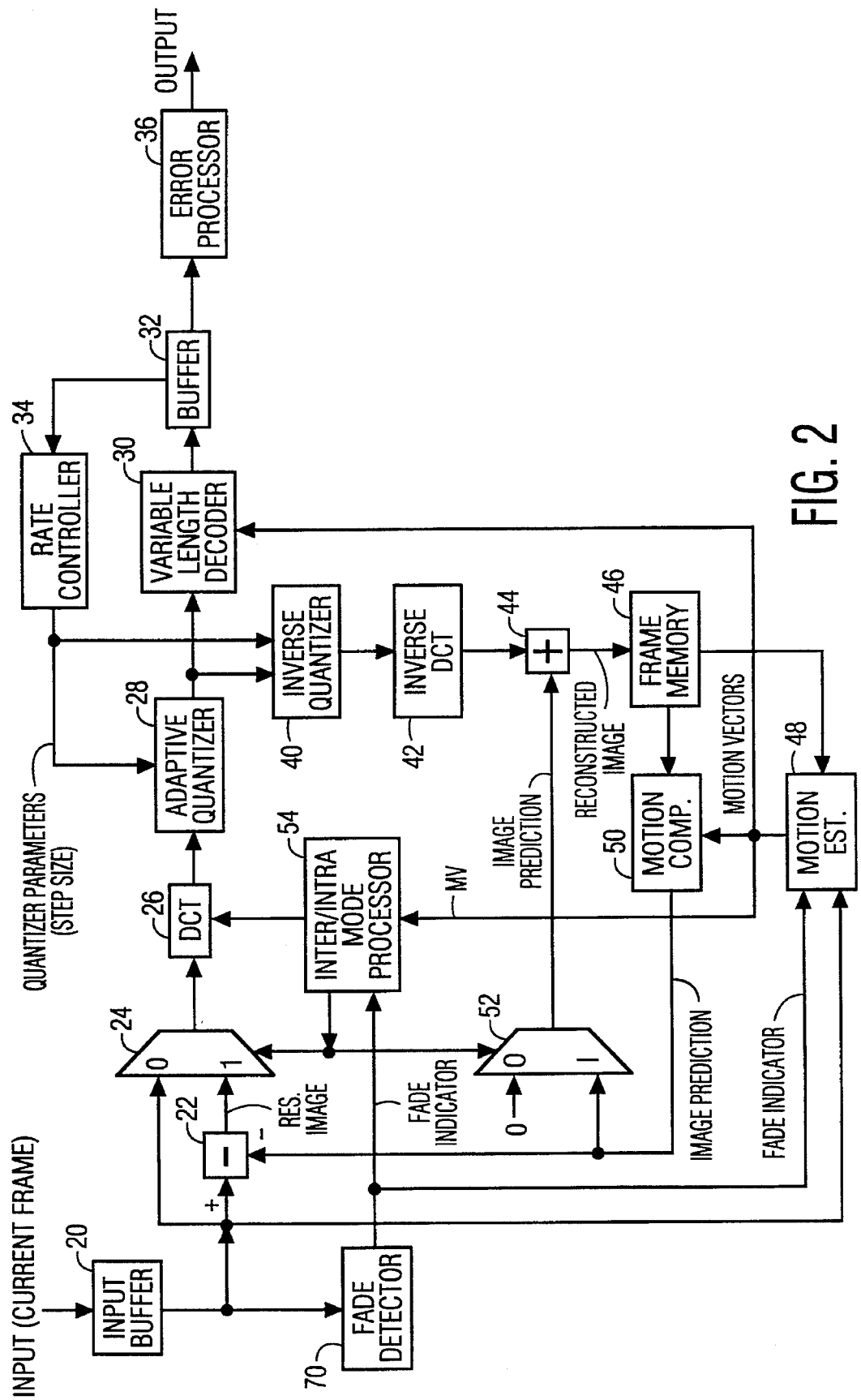
FIG. 2 is a block diagram of a video encoder including motion processing and a system in accordance with the principles of the present invention.
Figure 3:
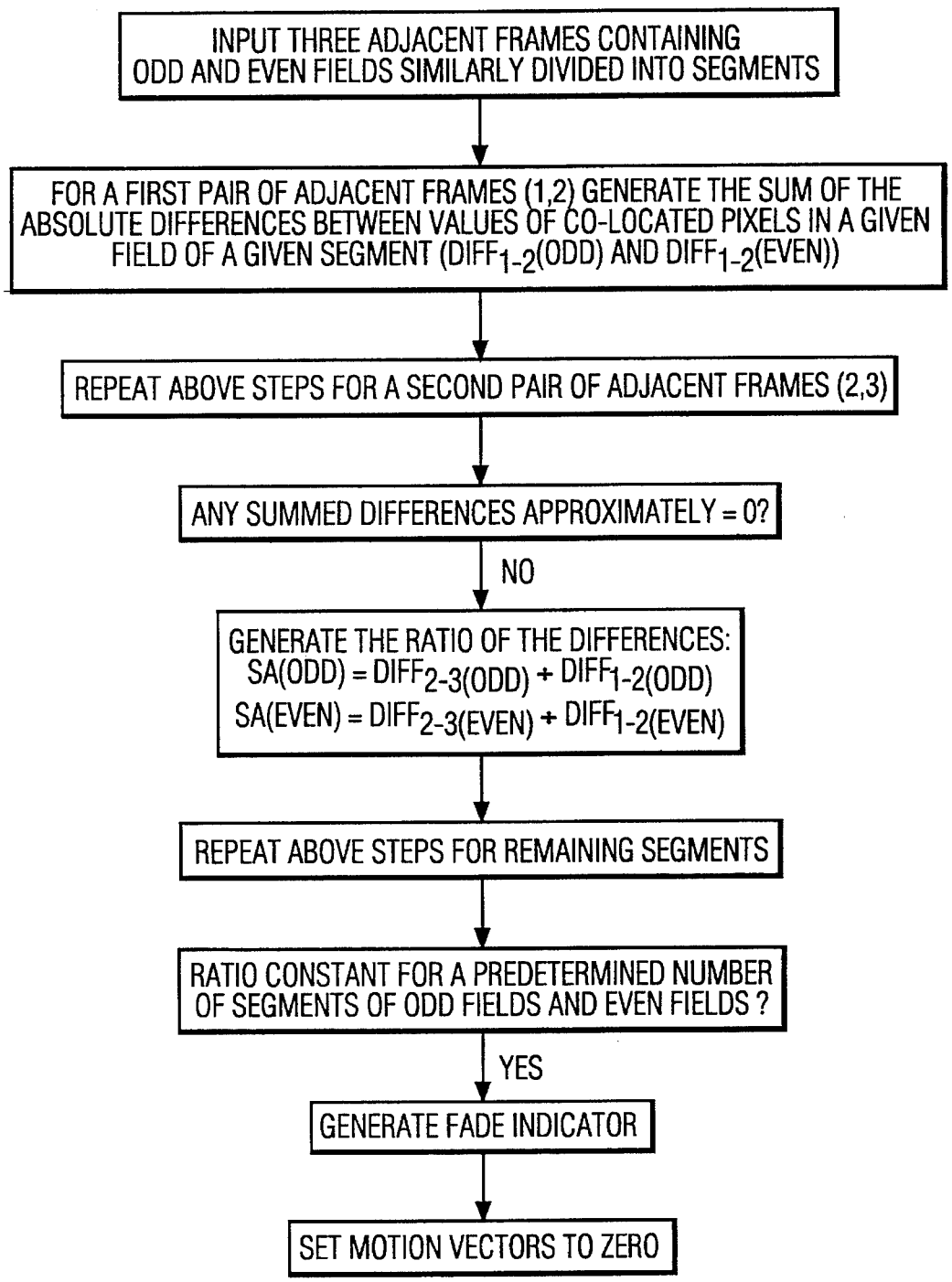
FIG. 3 is a flowchart of an algorithm for detecting a fading image.

In the system of FIG. 2, an input MPEG-compatible digital datastream represents image pixel data of a current image frame to be processed. The input data is stored by an input frame buffer 20. Data read out from buffer 20 is conveyed via a differencing network 22 and a multiplexer 24 to a Discrete Cosine Transform (DCT) unit 26. The operation of units 22 and 24 will be discussed subsequently in connection with motion processing aspects of the system of FIG. 2. The discrete cosine transform performed by unit 26 is a well known technique for effectively and efficiently reducing spatial redundancy of a video signal by transforming an input time domain signal into coefficients representing a discrete frequency spectrum. Each transform coefficient represents a block of 8×8 pixels, for example.

DCT transform coefficients from unit 26 are quantized by unit 28, variable length coded by unit 30, and stored by an output rate buffer 32 before being subjected to forward error correction (FEC) processing by unit 36. The content (fullness) of buffer 32 is monitored by a rate controller 34, which provides an output control signal that is used to adaptively alter quantization parameters (eg., quantization step size) of quantizer 28. By this mechanism the datastream bit rate is controlled so that the average input rate to buffer 32 is substantially constant. Buffer underflow and overflow are largely prevented, and a substantially constant buffer output bit rate is achieved. The output signal from processor 36 is appropriately processed, eg., by filtering and modulating, before being conveyed to an output channel.

Blocks 40–54 of FIG. 2 form a known arrangement of a DPCM motion estimation/compensation encoder together with blocks 22–28. A system of this type is described in the Ang et al. article mentioned previously, *Video Compression Makes Big Gains*. In accordance with the principles of the present invention, an image fading detector 70 is included for generating a Fade Indicator signal. This signal is generated after an analysis of a sequence of adjacent frames as discussed in connection with FIG. 1, and is applied to control inputs of mode control 54 and motion estimator 48. In addition, motion vectors MV developed by motion estimator 48 are applied to a control input of mode processor 54.

The motion processor operates in either an intra-frame coding mode, or in a predictive inter-frame coding mode. In intra-frame coding, the video signal itself is coded. In inter-frame coding, what is coded is a residual image signal which represents the difference between the current frame and the prediction of the current frame. When the prediction is good, inter-frame coding is used and is usually preferred because less frame information needs to be coded. With predictive coding, the value of a pixel is predicted based on its history. The predicted value is subtracted from the current value of the pixel to produce an error, or residual, which is coded and transmitted. A receiver adds the received residual to its own prediction to obtain the correct current pixel value. The discussion which follows assumes predictive inter-frame coding is used.

In the motion processing operation, quantized residual image data from unit 28 in inversely quantized by unit 40 and inversely DCT transformed by unit 42 before being applied to an additive combiner 44. Another input of combiner 44 receives a predicted image which is developed as will be discussed. A reconstructed frame image results from combining the residual image and predicted image inputs to combiner 44. Reconstruction is needed because inter-frame processing uses predictive coding, which requires the encoder to track the behavior of the decoder to prevent the decoder's reconstructed image from diverging from the original input image. The reconstructed image is stored by a frame memory 46. Motion estimator 48 receives a current frame input from the output of input buffer 20, and a reconstructed frame input from frame memory 46. Using a search window, motion estimator 48 compares each (eg., 8×8) pixel block of the current frame with pixel blocks of the prior reconstructed image from memory 46. For each pixel block a motion vector (MV) is generated to indicate the relative locations of (offset between) the best match between blocks in the current and reconstructed images. The motion vectors are coded by unit 30 and sent to the receiver.

The motion vectors from unit 48 are also provided to motion compensation unit 50, which develops predicted (position adjusted) blocks from memory 46 as a function of respectively associated motion vectors from estimator 48. This operation produces a predicted image comprising (eg., 8×8) motion compensated blocks from the reconstructed frame. The difference between the predicted image and the current input block, the residual image, is developed by subtractive combiner 22. The residual image is transformed, quantized, coded and conveyed to a receiver/decoder as discussed previously. The decoder performs the inverse of the coder functions. In an inter-frame operating mode, the decoder uses the motion vectors extracted from a variable length decoder to provide the locations of the predicted pixel blocks.

The encoder of FIG. 2 also includes a pair of multiplexers (MUXs) 24 and 52, and an associated inter/intra frame mode processor 54. Each MUX has a pair of inputs for receiving input signals to be switched, labeled "0" and "1." The 0 input of MUX 24 receives the current input signal, and the 0 input of MUX 52 receives a fixed bias level, eg., a "0"

logic level. The "1" inputs of MUXs 24 and 52 respectively receive the residual image signal and the predicted image signal. Mode processor 54 responds to motion vectors (MV) for determining whether inter-frame or intra-frame processing should be used. If the motion compensated prediction is good, mode processor 54 sends a signal to control inputs of MUXs 24 and 52 for enabling inter-frame processing. In this case MUX 52 passes the predicted image signal from unit 50 to adder 44, and MUX 24 is enabled to pass the residual image signal to DCT unit 26 and following units. Conversely, if the prediction is not good, the signal from mode processor 54 enables intra-frame processing. In this case the current frame information itself rather than the residual image signal is passed to DCT unit 24 and subsequent coding units, and the predicted image signal is decoupled from adder 44. The decision as to whether or not a prediction is good is based on a variety of factors which vary in accordance with the requirements of a particular system, such as image quality and the number of bits required.

The signal sent from mode processor 54 to DCT unit 26 instructs unit 26 to either encode the motion predicted error signal (inter-coding), or to encode a macroblock of the original image without motion estimated prediction (intra-coding). Mode processor 54 essentially gives DCT unit 26 a block to process. The inter/intra coding decision is based on efficiency of coding, which may be determined in many ways. Basically, this determination is a function of the number of bits needed to code a macroblock at a given level of quality, and the level of quality at a given number of coding bits. Motion vectors indicate which image region to derive the difference signal from. Intra-coding may be used as a default coding decision if equal coding efficiency is indicated as between intra- and inter-coding. A predetermined threshold may be used in the decision to default to intra-coding.

Mode processor 54 also receives a Fade Indicator control signal from fade detector 70, which operates as explained in connection with FIG. 1. Fade detector 70 may include three frame storage devices for storing the three-frame sequence described previously, as well as digital signal processing circuits for differencing similarly located segment pixels in adjacent frames, a circuit for obtaining the absolute values of the pixel differences, a circuit for summing the absolute values, and a dividing circuit for obtaining the ratio of the summed differences from adjacent frames. A suitable amount of memory may be provided as needed to perform these functions. These elements have not been shown to simplify the drawing.

Briefly, unit 70 provides an indication of image fading by analyzing a sequence of three adjacent image frames to develop a ratio of the sum of absolute pixel differences over the three frame sequence. If a luminance gradient associated with image fading is detected, the Fade Indicator instructs motion estimator 48 to set the output motion vector values to zero (i.e., to coordinates 0,0) for all frames for which fading is detected. Zeroing motion vectors may be accomplished by known techniques, such as by the motion estimator generating variable length codes representative of no spatial displacement. Variations of this result may be used in hierarchical motion estimator systems that set motion vectors at a particular level such as coarse, fine, or half-pixel. The modified output of motion estimator 48 is processed and evaluated, as known, by macroblock decision networks in mode processor 54. The decision circuits preferably should be biased slightly toward an intra-frame coding decision. Although inter-frame coding would use about the same number or slightly fewer coding bits as intra-frame coding, inter-coding would produce more visible coding artifacts.

When the zeroed (0,0) motion vectors are not found to be a good match, mode processor 54 will cause the system to operate in an intra-frame coding mode. However, when zeroed motion vectors are a good match, which is typical for image fading with little or no motion, estimator 48 will produce a good result and unit 54 will instruct the system to perform inter-frame coding.

It has been determined that during image fading, frame-to-frame amplitude (luminance) change is typically more significant than motion related change. Assigning a zero (0,0) value to motion vectors has been found to produce very good results in the presence of fading. Zeroing the motion vectors in the presence of fading also advantageously reduces the number of bits needed for coding, and may be used to alter the coding procedure of a given system, eg., between inter- and intra-frame coding. Motion vectors of a moving scene are not coded when fading is detected and it is determined that only a small percentage of the image contains motion, eg., 10% or less, and that frame-to-frame luminance changes do not give rise to motion vectors.

Motion processing systems that are likely to be found in consumer products may not be sophisticated enough to distinguish between true motion, and an image intensity gradient such as a luminance gradient over several frames. These systems may perceive such gradients as "motion" and generate false motion vectors. Coding efficiency will improve when the motion processing system is informed that such a perceived "motion vector" actually has a (0,0) value as discussed above, whereby coding bits are not wasted on false motion vectors.

What is claimed is:

1. In a system for processing an image representative signal, a method for detecting an image intensity gradient among a plurality of image frames including first and second adjacent pairs of adjacent frames, said method comprising the steps of:

(A) partitioning each of said plurality of frames into a predetermined similar arrangement of segments;

(B) summing pixel intensity differences between similarly located pixels for a given segment of a first adjacent pair of said adjacent frames, for producing a first difference signal;

(C) summing pixel intensity differences between similarly located pixels for said given segment of a second adjacent pair of said adjacent frames, for producing a second difference signal;

(D) determining the ratio of the values of said first and second difference signals;

(E) repeating steps (B)–(D) for remaining ones of said segments (B–L); and (F) generating an indicator signal when said ratio is substantially constant for a predetermined number of said segments.

2. A method according to claim 1 in a system including an image motion processing network for generating motion vectors, comprising the further step of zeroing said motion vectors in response to said indicator signal.

3. A method according to claim 1 wherein said first pair of adjacent frames is prior in time to said second pair of adjacent frames, wherein said ratio determining step determines the ratio of said second difference signal to said first difference signal.

4. A method according to claim 1 further including the step of obtaining the absolute value of pixel intensity differences; and wherein said summing steps sum the absolute value of pixel intensity differences.

5. A method according to claim 1 wherein each of said plurality of image frames is constituted by an odd image field and an even image field, and wherein said summing step (B) sums pixel intensity differences between similarly located pixels for a given segment of both said odd and even fields of said first pair of adjacent frames, for producing a first odd field difference signal and a first even field difference signal;

said summing step (C) sums pixel intensity differences between similarly located pixels for a given segment of both said odd and even fields of said second pair of adjacent frames, for producing a second odd field difference signal and a second even field difference signal; and said determining step determines a first ratio of the values of said first and second odd field difference signals, and a second ratio of the values of said first and second even field difference signals.

6. A method according to claim 5, wherein said first pair of adjacent frames is prior in time to said second pair of adjacent frames; and said ratio determining step determines a first ratio of said second odd field difference signal to said first odd field difference signal, and determines a second ratio of said second even field difference signal to said first even field difference signal.

7. A method according to claim 1 and further including the step of determining if a predetermined number of summed differences in steps (B) and (C) are approximately equal to zero; and performing said step (D) if said predetermined number of summed differences are not approximately equal to zero.

* * * * *